United States Patent
Ohno et al.

(10) Patent No.: US 10,112,261 B2
(45) Date of Patent: Oct. 30, 2018

(54) PROCESSING NOZZLE, PROCESSING HEAD, AND OPTICAL MACHINING APPARATUS

(71) Applicant: TECHNOLOGY RESEARCH ASSOCIATION FOR FUTURE ADDITIVE MANUFACTURING, Tokyo (JP)

(72) Inventors: Hiroshi Ohno, Kanagawa (JP); Satoshi Tsuno, Kanagawa (JP); Yuji Sasaki, Kanagawa (JP); Go Obara, Kanagawa (JP); Naotada Okada, Kanagawa (JP)

(73) Assignee: TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 83 days.

(21) Appl. No.: 15/119,816

(22) PCT Filed: Nov. 11, 2015

(86) PCT No.: PCT/JP2015/081725
§ 371 (c)(1),
(2) Date: Aug. 18, 2016

(87) PCT Pub. No.: WO2017/081765
PCT Pub. Date: May 18, 2017

(65) Prior Publication Data
US 2017/0259377 A1 Sep. 14, 2017

(51) Int. Cl.
*B23K 26/14* (2014.01)
*B23K 26/34* (2014.01)
(Continued)

(52) U.S. Cl.
CPC .......... *B23K 26/1476* (2013.01); *B05B 7/228* (2013.01); *B23K 26/144* (2015.10);
(Continued)

(58) Field of Classification Search
CPC ...... B23K 26/144; B23K 26/14; B23K 26/34; B23K 26/342; B23K 26/1476; B23K 26/21; B33Y 30/00; B33Y 40/00; B05B 7/228
(Continued)

(56) References Cited

U.S. PATENT DOCUMENTS

| | | | |
|---|---|---|---|
| 5,122,632 A | 6/1992 | Kinkelin | |
| 5,418,350 A | 5/1995 | Freneaux et al. | |

(Continued)

FOREIGN PATENT DOCUMENTS

| | | |
|---|---|---|
| JP | 6-507679 A | 9/1994 |
| JP | 7-51872 A | 2/1995 |

(Continued)

OTHER PUBLICATIONS

International Search Report (ISR) dated Feb. 9, 2016 for International Application No. PCT/JP2015/081725.

(Continued)

Primary Examiner — Christopher Kim
(74) Attorney, Agent, or Firm — Ladas & Parry LLP

(57) ABSTRACT

A powder convergence improves without varying the flow velocity and powder density of a powder flow. A processing nozzle includes an inner cone including a beam path that passes light from a light source, an outer cone arranged outside the inner cone, a fluid ejection channel formed by a gap between the inner cone and the outer cone, and including an ejection port that opens toward a process surface, and a fluid guide channel having a flow inlet for a fluid. The fluid
(Continued)

guide channel guides the fluid toward the fluid ejection channel in a direction away from the beam path.

10 Claims, 10 Drawing Sheets

(51) Int. Cl.
*B23K 26/21* (2014.01)
*B23K 26/144* (2014.01)
*B33Y 30/00* (2015.01)
*B33Y 40/00* (2015.01)
*B23K 26/342* (2014.01)
*B05B 7/22* (2006.01)

(52) U.S. Cl.
CPC .............. *B23K 26/21* (2015.10); *B23K 26/34* (2013.01); *B23K 26/342* (2015.10); *B33Y 30/00* (2014.12); *B33Y 40/00* (2014.12)

(58) Field of Classification Search
USPC ................... 219/121.84, 121.63, 76.1, 76.12
See application file for complete search history.

(56) References Cited

U.S. PATENT DOCUMENTS

| | | | |
|---|---|---|---|
| 7,223,935 B2 | 5/2007 | Wessner | |
| 2014/0186549 A1 | 7/2014 | Miyagi et al. | |
| 2017/0050198 A1* | 2/2017 | Ohno | B23K 26/144 |

FOREIGN PATENT DOCUMENTS

| | | |
|---|---|---|
| JP | 2003-340583 A | 12/2003 |
| JP | 2012-66290 A | 4/2012 |
| WO | 2013/046950 A1 | 4/2013 |

OTHER PUBLICATIONS

Written Opinion (WO) dated Feb. 9, 2016 for International Application No. PCT/JP2015/081725.
J-PlatPat English abstract of JP 2012-66290 A.
J-PlatPat English abstract of JP 2003-340583 A.
Japanese Office Action dated Jan. 24, 2017 in connection with corresponding Japanese Application No. 2016-510851.
Decision to Grant a Patent dated Jun. 26, 2018 for Application No. JP 2017-160781.
J-PlatPat English abstract of JP 7-51872 A.

* cited by examiner

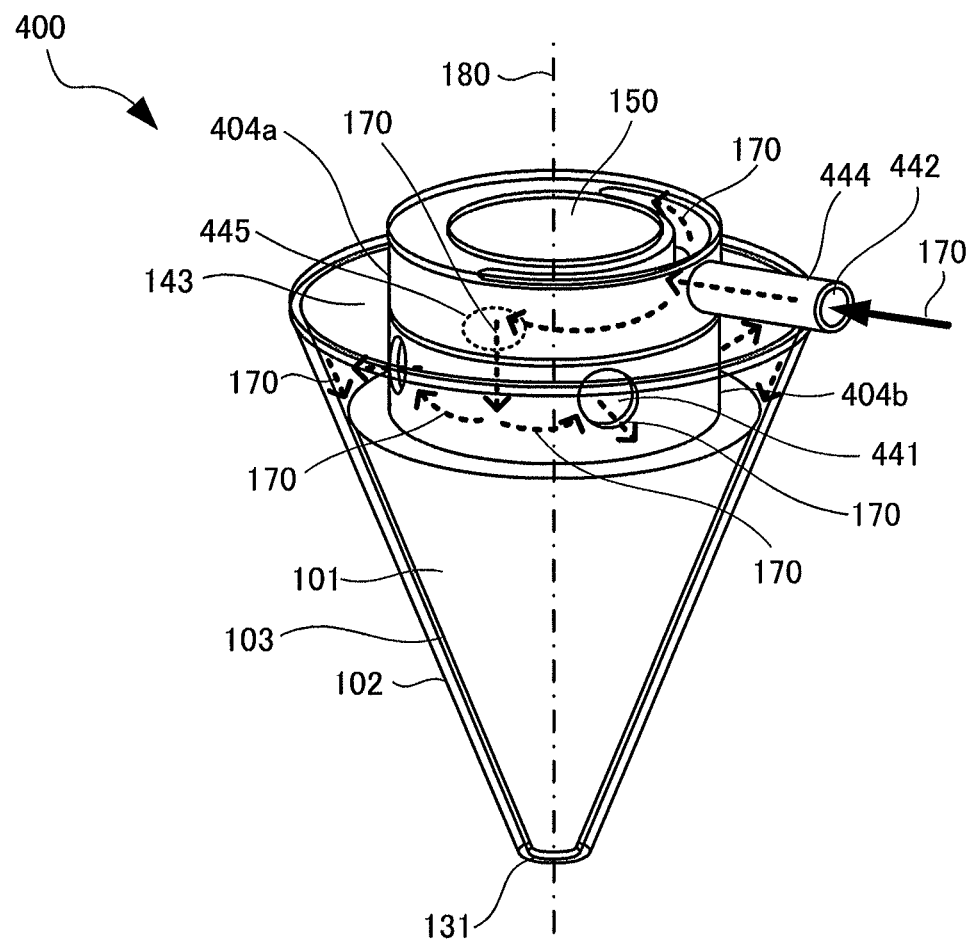
F I G. 4

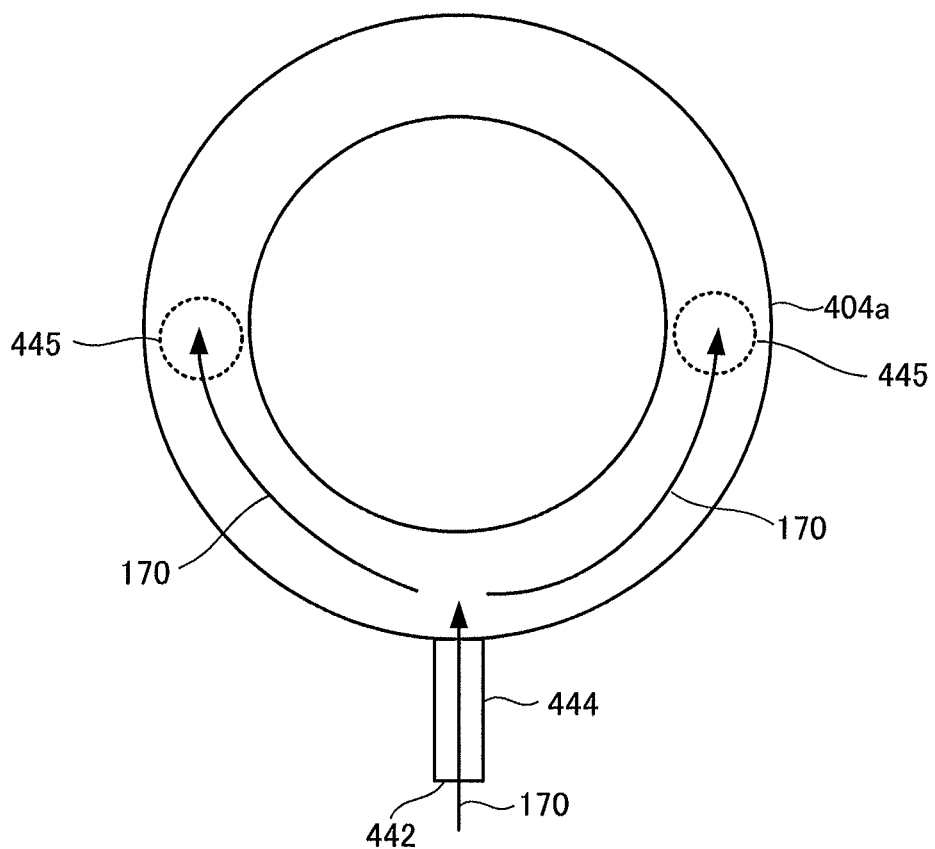
F I G. 6

PROCESSING NOZZLE, PROCESSING HEAD, AND OPTICAL MACHINING APPARATUS

RELATED APPLICATION

This application is an application under 35 U.S.C. 371 of International Application No. PCT/JP2015/081725 filed on Nov. 11, 2015, the entire contents of which are incorporated herein by reference.

TECHNICAL FIELD

The present invention relates to a processing nozzle for ejecting a fluid containing a processing material to a processing point in an optical machining apparatus which forms a shaped object by irradiating the fluid with light.

BACKGROUND ART

In the abovementioned technical field, patent literature 1 has disclosed a technique of supplying a powder to a slit as a powder channel in a processing nozzle, from outside the slit.

CITATION LIST

Patent Literature

Patent literature 1: U.S. Pat. No. 7,223,935

SUMMARY OF THE INVENTION

Technical Problem

In this technique described in the above literature, however, turbulence occurs in the powder flow, so the flow velocity and powder density of the powder flow vary, and this makes it impossible to improve the powder convergence.

The present invention enables to provide a technique of solving the above-described problem.

Solution to Problem

One aspect of the present invention provides a processing nozzle comprising:
an inner cone including a beam path that passes light from a light source;
an outer cone arranged outside the inner cone;
a fluid ejection channel formed by a gap between the inner cone and the outer cone, and including an ejection port that opens toward a process surface; and
a fluid guide channel having an introduction port for a fluid,
wherein the fluid guide channel guides the fluid toward the fluid ejection channel in a direction away from the beam path.

Another aspect of the present invention provides an optical machining apparatus including the abovementioned processing nozzle.

Still other aspect of the present invention provides a processing head including
the abovementioned processing nozzle,
the light source,
a light transmitter that transmits light generated from the light source, and
an optical system that guides the light transmitted from the light transmitter to the beam path.

Still other aspect of the present invention provides an optical machining apparatus including the abovementioned processing head.

Advantageous Effects of Invention

According to the present invention, no turbulence occurs in a powder flow, so the flow velocity and powder density of the powder flow do not vary, and this makes it possible to improve the powder convergence.

BRIEF DESCRIPTION OF DRAWINGS

FIG. 4 is a perspective view showing the arrangement of a processing nozzle according to the second embodiment of the present invention;

FIG. 6 is a schematic plan view for explaining an outline of the flowing of a powder flow in a branching portion (upper stage) of the processing nozzle according to the second embodiment of the present invention;

DESCRIPTION OF THE EMBODIMENTS

Embodiments of the present invention will exemplarily be explained in detail below with reference to the accompanying drawings. Note that the arrangements, numerical values, procedures, functional elements, and the like described in the following embodiments are merely examples, are freely modifiable or changeable, and are not intended to limit the technical scope of the present invention to the following description.

First Embodiment

Figure 1:
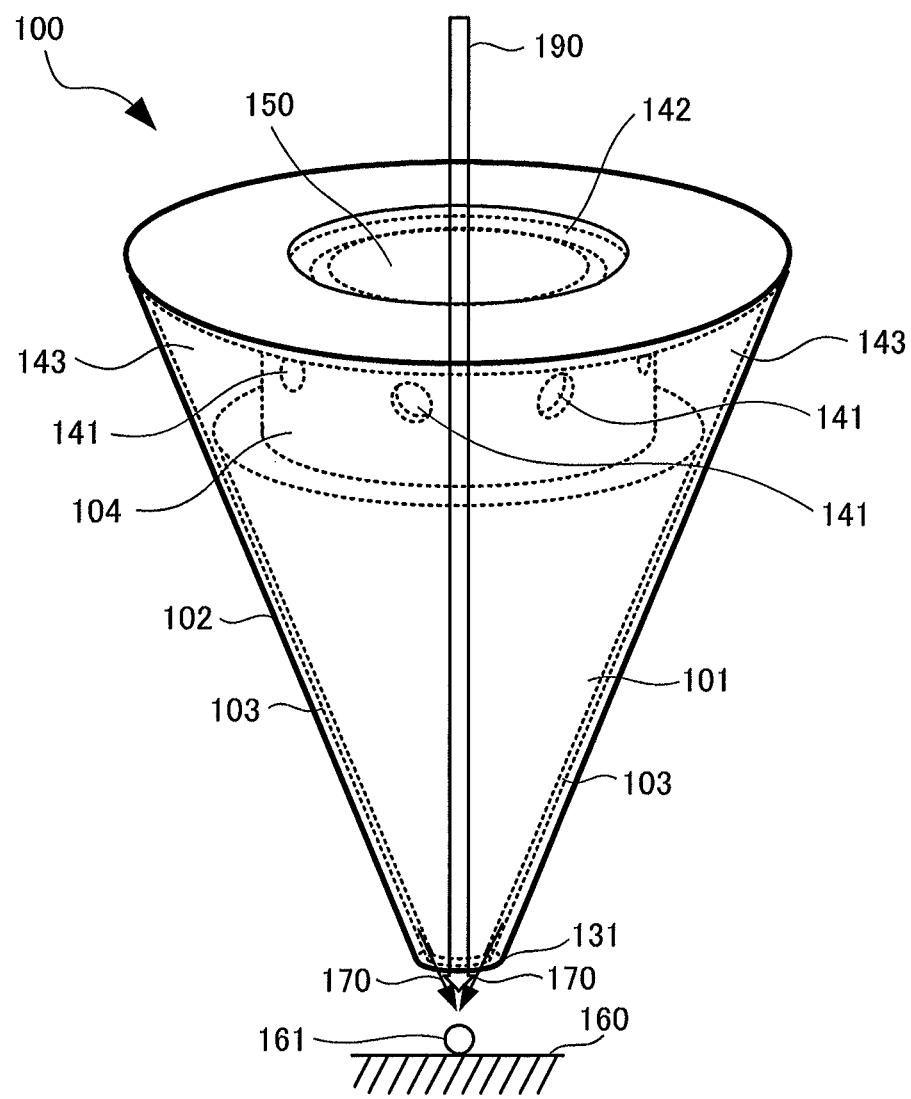
FIG. 1 is a perspective view showing the arrangement of a processing nozzle according to the first embodiment of the present invention.

A processing nozzle as the first embodiment of the present invention will be explained with reference to FIGS. 1 to 3. FIG. 1 is a perspective view for explaining the arrangement of a processing nozzle 100 according to this embodiment. The processing nozzle 100 is arranged at and attached to the distal end of a head of an optical machining apparatus. This optical machining apparatus to which the processing nozzle 100 is attached condenses a light beam 190 such as a laser beam to a processing point 161 on a process surface 160.

A metal powder or the like as a material is mixed in an inert gas and supplied as a fluid such as a powder flow 170 to the processing nozzle 100, and the powder flow 170 is ejected to the processing point 161 from an ejection port 131 at the distal end of the processing nozzle 100. Then, the optical machining apparatus melts the metal powder or the like contained in the powder flow 170 ejected from the processing nozzle 100 by the light beam 190 such as a laser beam, thereby forming a three-dimensional shaped object or performing overlay welding.

As shown in FIG. 1, the processing nozzle 100 includes an inner cone 101, an outer cone 102, a fluid ejection channel (slit) 103, and a fluid guide channel (branching portion) 104. The inner cone 101 includes a beam path 150 for passing the light beam 190 from a light source (not shown). The outer cone 102 is arranged outside the inner cone 101. The slit 103 is formed by the outer surface of the inner cone 101 and the inner surface of the outer cone 102, and includes the ejection port 131 which opens toward the process surface 160. The fluid guide channel 104 and a flow inlet 142 thereof are formed by two coaxially arranged annular walls. A plurality of branch passage ports 141 arranged at predetermined intervals are formed in the outer circumferential portions of the two annular walls. The branch passage ports 141 are so opened as to guide a fluid away from the beam path 150. In this arrangement described above, a fluid flowing from the flow inlet 142 is guided to the branch passage ports 141 by the fluid guide channel 104. The fluid is then guided toward the fluid ejection channel 103 in the direction away from the beam path 150.

The overall structure of the processing nozzle 100 is a structure in which the outer cone 102 whose inner surface forms a tapered (conical) space is coaxially arranged outside the inner cone 101 having a tapered (conical) outer surface. This structure has a gap formed between the outer surface of the inner cone 101 and the inner surface of the outer cone 102, i.e., has the slit 103. Note that it is not always necessary to coaxially arrange the inner cone 101 and outer cone 102, and the method of arrangement is not limited as long as the slit 103 is formed between the inner cone 101 and outer cone 102.

The powder flow 170 containing the metal powder or the like as a material reaches the processing point 161 through the slit 103. Also, the light beam 190 such as a laser beam reaches the processing point 161 through the beam path 150.

The outer diameter of the branching portion 104 is smaller than that of the bottom surface of the inner cone 101 having the conical shape, so a space is formed between the branching portion 104 and outer cone 102, and this space functions as a buffer tank 143.

The branching portion 104 includes the branch passage ports 141 and flow inlet 142. The powder flow 170 supplied from the flow inlet 142 flows into the branching portion 104.

Then, the powder flow 170 having flowed into the branching portion 104 as a fluid guide channel passes through the branch passage ports 141 as openings formed in the branching portion 104, and flows from the inside to the outside of the branching portion 104. The powder flow 170 having flowed out through the branch passage ports 141 flows into the buffer tank 143. After that, the powder flow 170 flows into the slit 103 from the buffer tank 143, and is supplied to the processing point 161 through the slit 103. Therefore, the powder flow 170 is ejected to the processing point 161 from the ejection port 131 at the distal end of the processing nozzle 100, and the ejected powder flow 170 is irradiated with the light beam 190 such as a laser beam output from the beam path 150.

The light beam 190 passes through the beam path 150, and an inert gas also flows through the beam path 150. Examples of the inert gas are argon, helium, and nitrogen, but the gas is not limited to these examples. By thus supplying the inert gas, it is possible to prevent oxidation of the process surface 160 and processing point 161, and prevent a foreign body such as fume from entering the processing nozzle 100 from the process surface 160 or processing point 161.

Next, fluid supply paths in the processing nozzle 100 will be explained with reference to FIGS. 2 and 3. FIG. 2 is a schematic plan view for explaining the arrangement of the processing nozzle 100 according to this embodiment. FIG. 3 is a schematic side sectional view for explaining the arrangement of the processing nozzle 100 according to this embodiment. Note that in FIG. 2, the thicknesses and the like of the inner cone 101, outer cone 102, and branching portion 104 are suitably omitted to avoid the drawing from being complicated.

Figure 2:
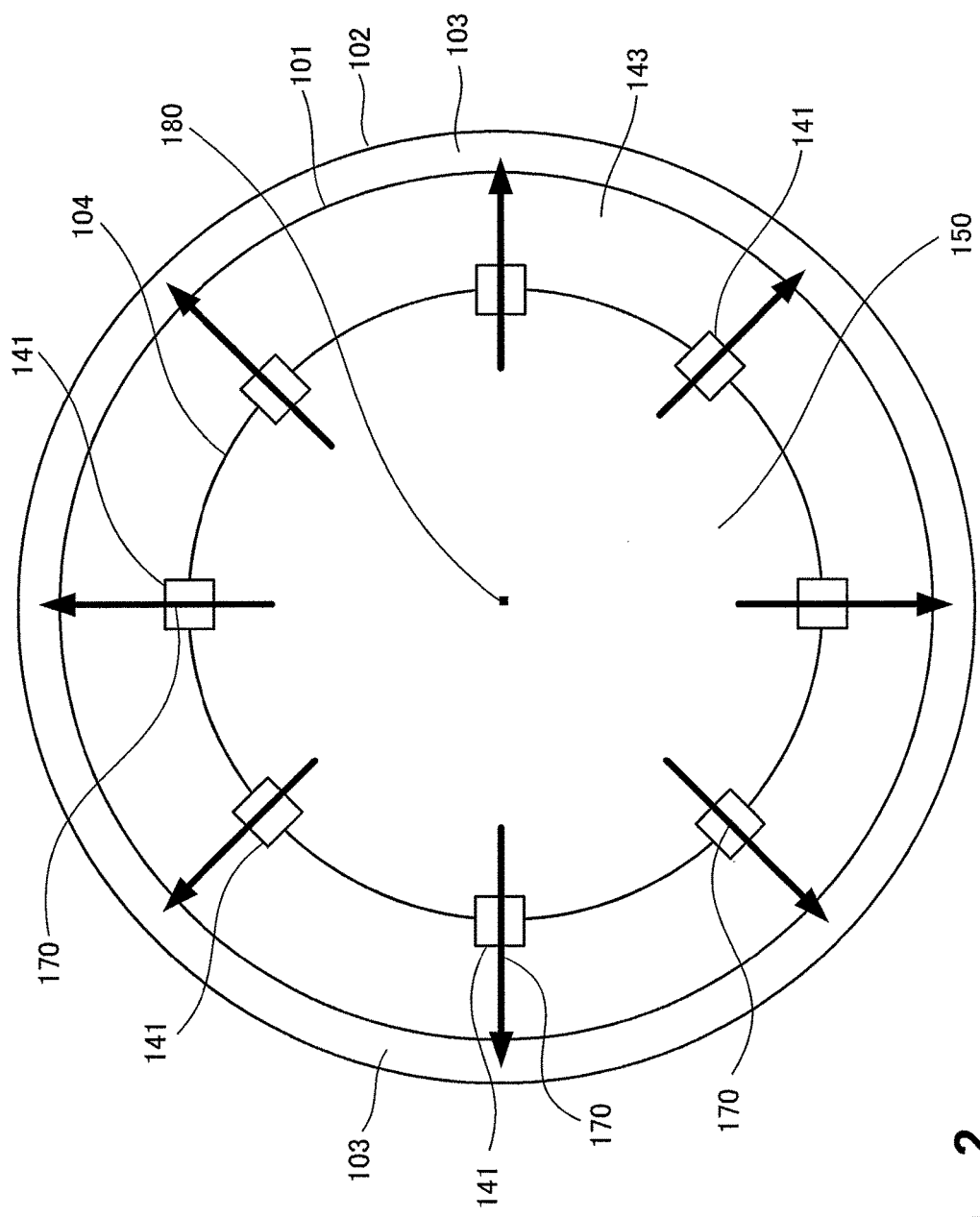
FIG. 2 is a schematic plan view showing the arrangement of the processing nozzle according to the first embodiment of the present invention.

As shown in FIG. 2, the plurality of branch passage ports 141 are arranged to be rotationally symmetrical with respect to a central axis 180. "Rotationally symmetrical" herein mentioned means that when an object is rotated around a rotation axis, the object matches the original shape at a rotation angle of less than 360°. Note that the number of branch passage ports 141 is eight (eight branches) in this embodiment, but the number of branches is not limited to eight and may also be two, four, or sixteen. Note also that when the branch passage ports 141 are arranged to be rotationally symmetrical, the plurality of branch passage ports 141 are arranged at predetermined intervals, so the powder flow 170 is isotropically equally branched with respect to the central axis 180.

Figure 3:
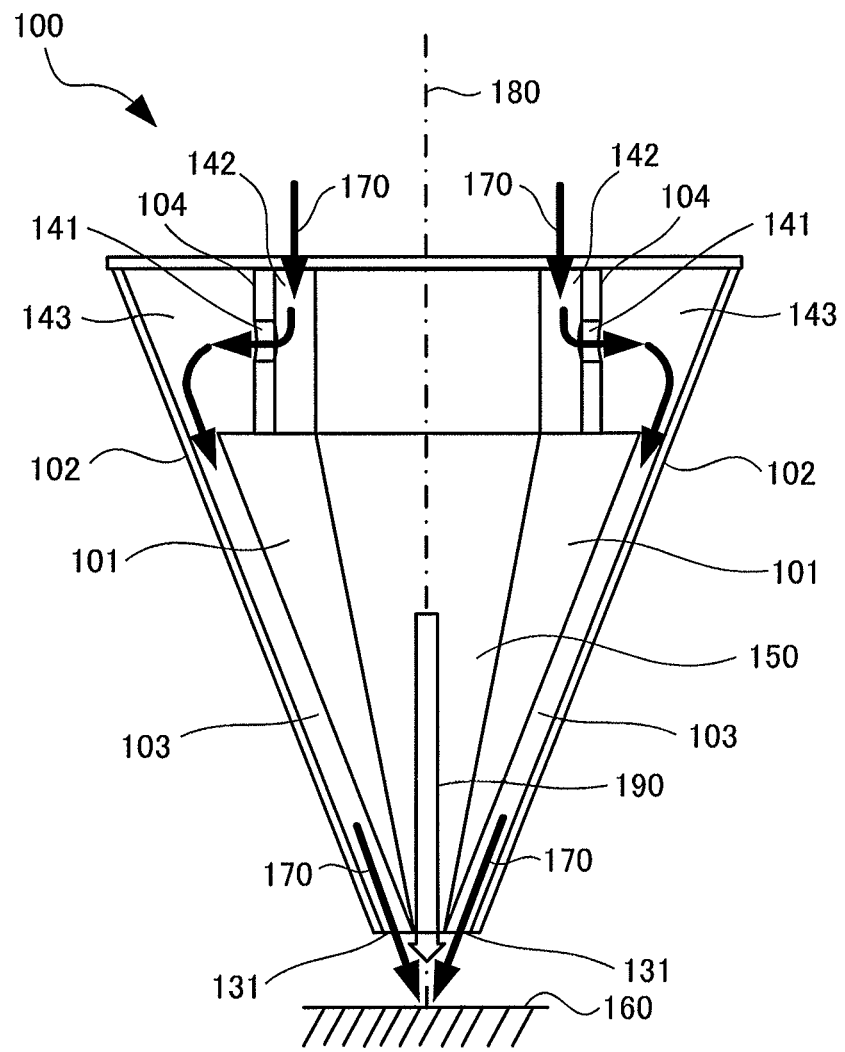
FIG. 3 is a schematic side sectional view showing the arrangement of the processing nozzle according to the first embodiment of the present invention.

As shown in FIG. 3, the powder flow 170 supplied from a material supplier (not shown) is supplied to the processing point 161 as indicated by arrows in FIG. 3. More specifically, the powder flow 170 flowing from the flow inlet 142 is ejected toward the buffer tank 143 through the branch passage ports 141. That is, the powder flow 170 is ejected outside with respect to the central axis 180 from inside the branching portion 104, and flows into the buffer tank 143. The powder flow 170 having flowed into the buffer tank 143 flows into the slit 103 formed by the gap between the inner cone 101 and outer cone 102. The powder flow 170 having flowed into the slit 103 flows through the slit 103, and is ejected toward the processing point 161 from the ejection port 131 in the distal end portion of the slit 103.

As described above, the powder flow 170 is guided away from the central axis 180, i.e., guided from the inside to the outside. In addition, since the branch passage ports 141 are arranged to be rotationally symmetrical, a fluid such as the powder flow 170 can isotropically naturally be diffused. Since this can make the concentration of the powder flow 170 uniform, concentration unevenness can be reduced. By contrast, if the powder flow 170 flows toward the central axis 180, i.e., flows in a direction in which the powder flow 170 is compressed, the concentration of the powder in the powder flow 170 becomes uneven. That is, the concentration unevenness of the powder in the powder flow 170 can be reduced by isotropically naturally diffusing the powder flow 170. When the concentration unevenness of the powder flow 170 reduces in the processing nozzle 100, the concentration uniformity of the powder flow 170 in the slit 103 increases, so the powder convergence of the powder flow 170 at the processing point 161 improves.

Also, the flow velocity of the powder flow 170 decreases once because the powder flow 170 flows into the buffer tank 143 as a wide space through the branch passage ports 141 from the flow inlet 142 as a narrow space. Since the flow velocity of the powder flow 170 decreases, a time during which the powder flow 170 stays in the buffer tank 143 prolongs, and a time during which the powder flow 170 and the powder contained in the powder flow 170 are naturally diffused in the buffer tank 143 prolongs. That is, since the powder flow 170 is sufficiently diffused in the buffer tank 143, the concentration unevenness of the powder contained in the powder flow 170 can further be reduced, and the occurrence of turbulence can also be suppressed. When the concentration unevenness of the powder flow 170 reduces inside the buffer tank 143, the concentration uniformity of the powder flow 170 in the slit 103 increases, and the powder convergence of the powder flow 170 at the processing point 161 improves.

A sectional area crossing the central axis of the slit 103 as a channel of the powder flow 170 decreases toward the processing point 161. Since the flow velocity (velocity) of the powder flow 170 flowing through the slit 103 is almost inversely proportional to the sectional area of the slit 103, the flow velocity increases as the powder flow 170 approaches the processing point 161. That is, the ejection velocity of the powder flow 170 to be ejected can be increased at the ejection port 131, so the powder flow 170 can reliably reach the processing point 161, and the powder convergence can be improved. Note that the sectional area crossing the central axis of the slit 103 need not always decrease toward the processing point 161, and may also be constant or gradually increase.

Furthermore, the light beam 190 is not limited to a laser beam, and can be any light beam as long as the beam can melt the powder material at the processing point. For example, the light beam 190 may also be a light beam such as an electromagnetic wave from the infrared region to the ultraviolet region.

In this embodiment, no turbulence occurs in the powder flow, so the flow velocity and powder density of the powder flow do not vary, and the powder convergence can be improved. The powder convergence can also be improved because the concentration unevenness of the powder contained in the powder flow can be reduced inside the processing nozzle.

Second Embodiment

Figure 5:
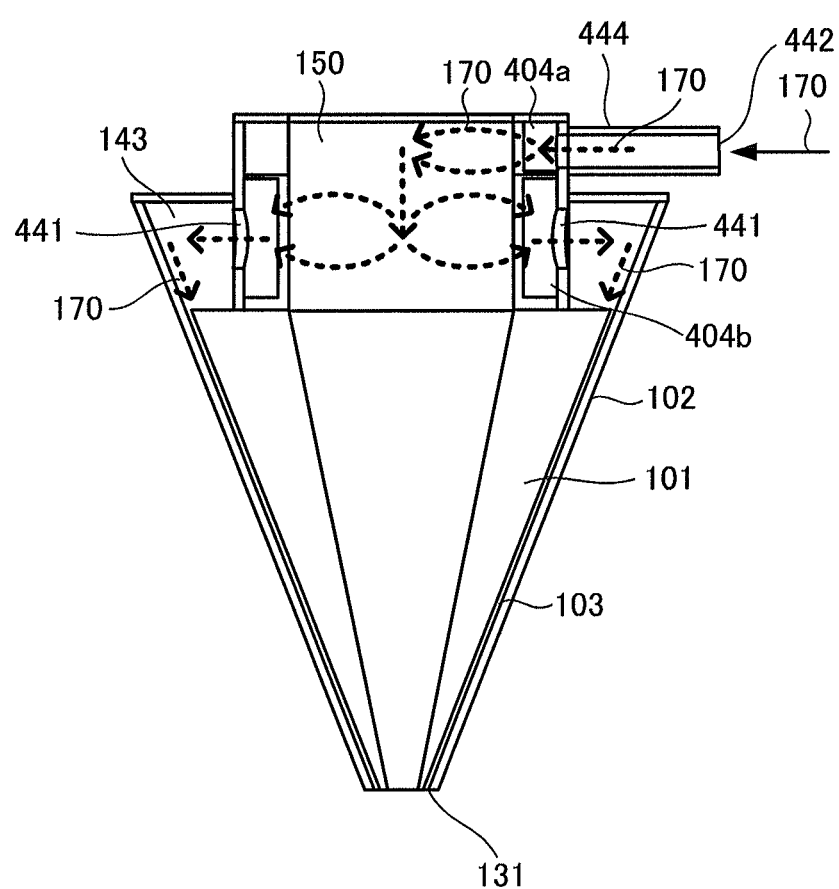
FIG. 5 is a schematic side sectional view showing the arrangement of the processing nozzle according to the second embodiment of the present invention.

A processing nozzle according to the second embodiment of the present invention will be explained below with reference to FIGS. 4 to 7. FIG. 4 is a perspective view for explaining the arrangement of the processing nozzle according to this embodiment. FIG. 5 is a schematic sectional view for explaining an outline of fluid supply by the processing nozzle according to this embodiment. The processing nozzle according to this embodiment differs from the aforementioned first embodiment in that the former includes a powder flow inlet pipe, and also includes two stages of upper and lower branching portions. The rest of the arrangement and the operation are the same as those of the first embodiment, so the same reference numerals denote the same parts and the same operations, and a detailed explanation thereof will be omitted.

A processing nozzle 400 includes a branching portion 404a, a branching portion 404b, an introduction pipe 444, and a branch passage port 445. The branching portion 404a has the introduction pipe 444, and an introduction port 442 of the introduction pipe 444 is positioned outside (in a portion outside) the processing nozzle 400. That is, the introduction port 442 is positioned farther from a central axis 180 than the branching portion 404a. Since the introduction pipe 444 or introduction port 442 is thus arranged, even when a powder flow 170 is supplied from outside the processing nozzle 400, the powder flow 170 can be introduced to a side close to the central axis 180, i.e., can be introduced inside the processing nozzle 400.

The branching portions 404a and 404b are vertically stacked into two stages, and form a fluid guide channel for guiding the powder flow 170. A fluid such as the powder flow 170 flows into the branching portion 404b from the branch passage port 445 connecting a branching portion opening formed in the branching portion 404a and a branching portion inlet port formed in the branching portion 404b, and flows into a slit 103 through a branching portion opening formed in the branching portion 404b. That is, the powder flow 170 supplied from the introduction port 442 of the introduction pipe 444 flows through the upper branching portion 404a, and flows into the lower branching portion 404b after that. The powder flow 170 having flowed into the branching portion 404b flows out into a buffer tank 143 from four branch passage ports 441 which communicate from the branching portion opening formed in the branching portion 404b to the buffer tank 143. The powder flow 170 having flowed out into the buffer tank 143 flows into the slit 103, and is ejected from an ejection port 131 to a process surface 160.

Figure 7:
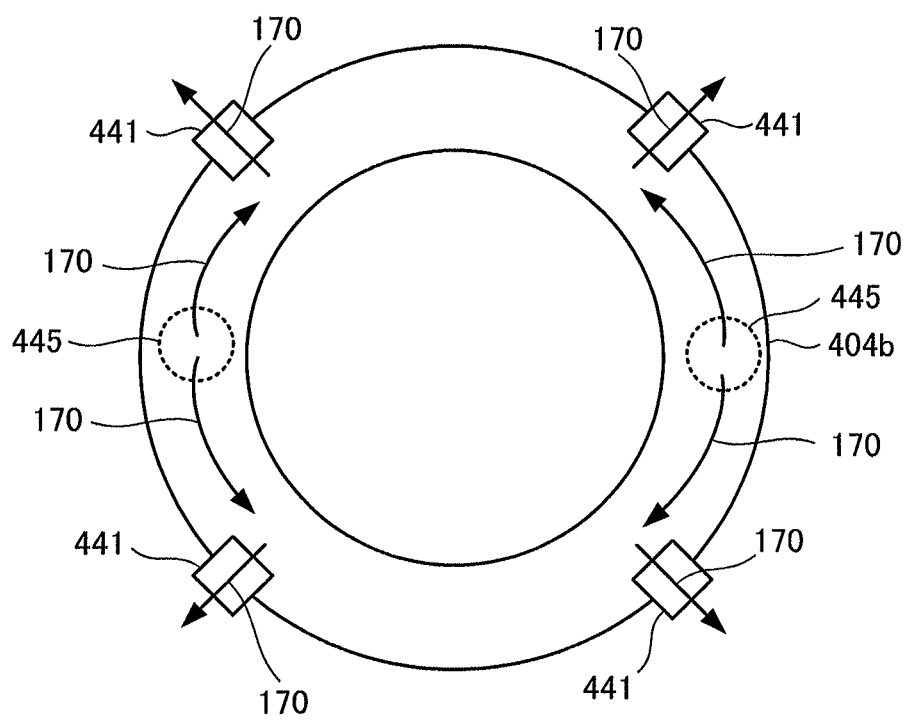
FIG. 7 is a schematic plan view for explaining an outline of the flowing of a powder flow in a branching portion (lower stage) of the processing nozzle according to the second embodiment of the present invention.

Next, the flowing of the powder flow 170 in the branching portions 404a and 404b will be explained with reference to FIGS. 6 and 7. FIG. 6 is a schematic plan view for explaining an outline of the flowing of the powder flow 170 in the upper branching portion 404a of the processing nozzle according to this embodiment. FIG. 7 is a schematic plan view for explaining an outline of the flowing of the powder flow 170 in the lower branching portion 404b of the processing nozzle according to this embodiment. Note that in FIGS. 6 and 7, the thicknesses and the like of the branching portions are properly omitted to avoid the drawings from being complicated.

As shown in FIG. 6, the powder flow 170 supplied from the introduction port 442 of the introduction pipe 444 to the branching portion 404a is branched into two flows in the branching portion 404a. The two branched powder flows 170 flow into the lower branching portion 404b from the branch passage ports 445 positioned in the bottom surface of the branching portion 404a. That is, the powder flows 170 fall from the upper branching portion 404a to the lower branching portion 404b, thereby flowing into the branching portion 404b.

As shown in FIG. 7, each of the powder flows 170 branched into two flows in the branching portion 404a and having flowed into the branching portion 404b is further branched into two flows in the branching portion 404b, i.e., the powder flow 170 is branched into a total of four flows. The four branched powder flows 170 flow out into the buffer tank 143 from the four branch passage ports 441 which communicate from the branching portion 404b to the buffer tank 143.

As described above, the powder flow 170 is branched into two flows in the branching portion 404a, and each of the two branched powder flows 170 is further branched into two flows in the branching portion 404b, thereby forming four branched powder flows 170. After that, the four branched powder flows 170 pass through the buffer tank 143 from the branch passage ports 441, flow into the slit 103, and are supplied as they are ejected from the ejection port 131 to the processing point 161.

Also, the branch passage ports 441 are arranged to be rotationally symmetrical with respect to the central axis 180, so the powder flow 170 can isotropically equally be branched. Note that the numbers of branches in the branching portions 404a and 404b are not limited to the numbers (from two branches to four branches) disclosed in this embodiment, and may also be, e.g., from four branches to eight branches, or from eight branches to sixteen branches.

In this embodiment, the powder flow can be diffused inside the nozzle by radially spreading the powder flow with respect to the beam path. In this case, turbulence generated when fluids branched outside a nozzle collide against each other inside the nozzle as in a conventional arrangement does not occur. Therefore, the flow velocity of the powder flow does not vary, so the powder convergence can be improved. The powder convergence can also be improved because the concentration unevenness of the powder contained in the powder flow can be reduced inside the processing nozzle. Furthermore, since the powder flow is equally branched, the concentration uniformity of the powder flow in the slit increases, so the powder convergence improves. In addition, the powder flow can naturally be diffused because radial powder flows can be formed with respect to the beam path.

Third Embodiment

Figure 8:
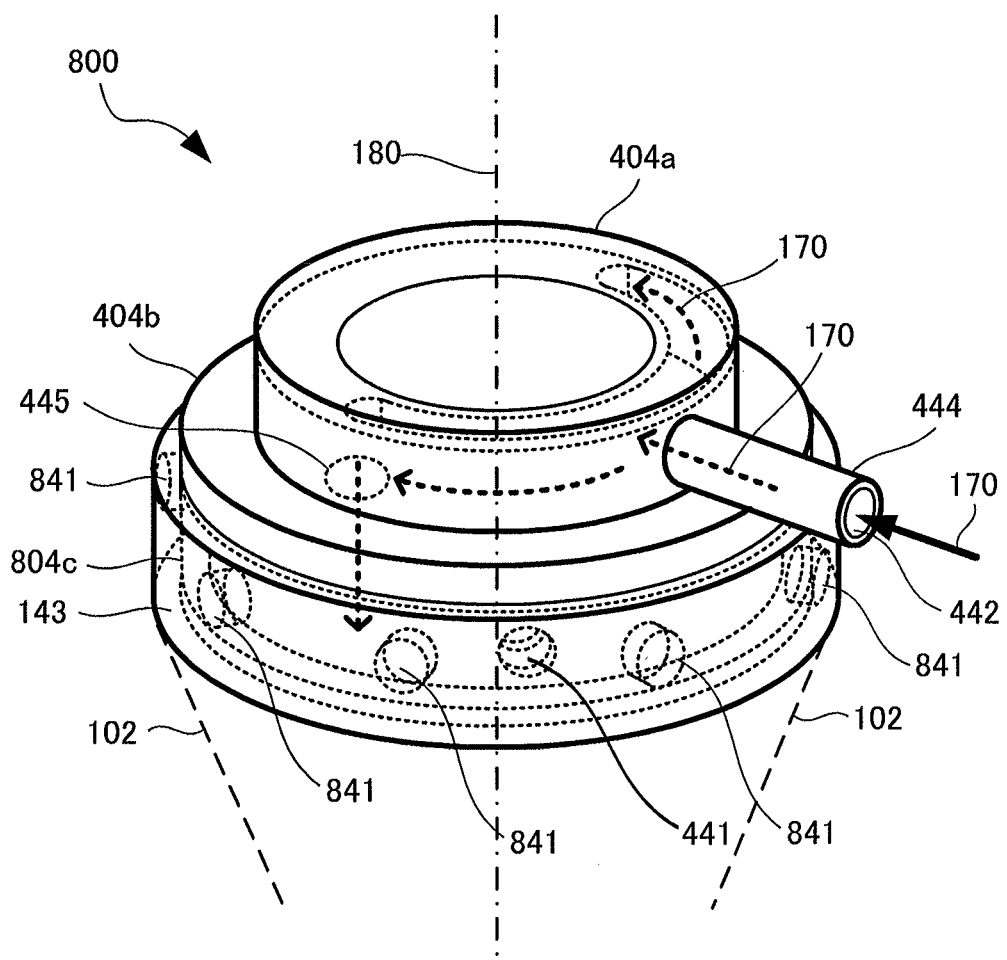
FIG. 8 is a perspective view showing the arrangement of a processing nozzle according to the third embodiment of the present invention.

A processing nozzle according to the third embodiment of the present invention will be explained below with reference to FIGS. 8 and 9. FIG. 8 is a perspective view for explaining the arrangement of a processing nozzle 800 according to this embodiment. Note that in FIG. 8, the distal end portion and the like of the processing nozzle formed by an inner cone and outer cone are properly omitted. The processing nozzle 800 according to this embodiment differs from the above-mentioned second embodiment in that a powder flow is sequentially branched into two flows and four flows, and finally branched into eight flows. The rest of the arrangement and the operation are the same as those of the second embodiment, so the same reference numerals denote the same parts and the same operations, and a detailed explanation thereof will be omitted.

The processing nozzle 800 further includes a branching portion 804c. That is, the processing nozzle 800 has a three-stage structure in which branching portions are arranged in the order of a branching portion 404a, a branching portion 404b, and the branching portion 804c from the upstream side.

The branching portions 404b and 804c are formed below the branching portion 404a, and the branching portion 804c is formed outside the branching portion 404b. That is, the diameter of the branching portion 804c is larger than that of the branching portion 404b. In addition, the branching portions 404a, 404b, and 804c are coaxially arranged with respect to a central axis 180.

By thus arranging the branching portions 404a, 404b, and 804c in order, the branching portions 404a, 404b, and 804c as fluid guide channels are sequentially arranged. A powder flow 170 is ejected toward the central axis 180 from an introduction port 442 of an introduction pipe 444, and introduced to the branching portion 404a. Note that in this embodiment, an example in which the powder flow 170 is introduced from outside the branching portion 404a by using the introduction pipe 444 is disclosed. However, the powder flow 170 may also be introduced from above the branching portion 404a as disclosed in the aforementioned first embodiment.

Figure 9:
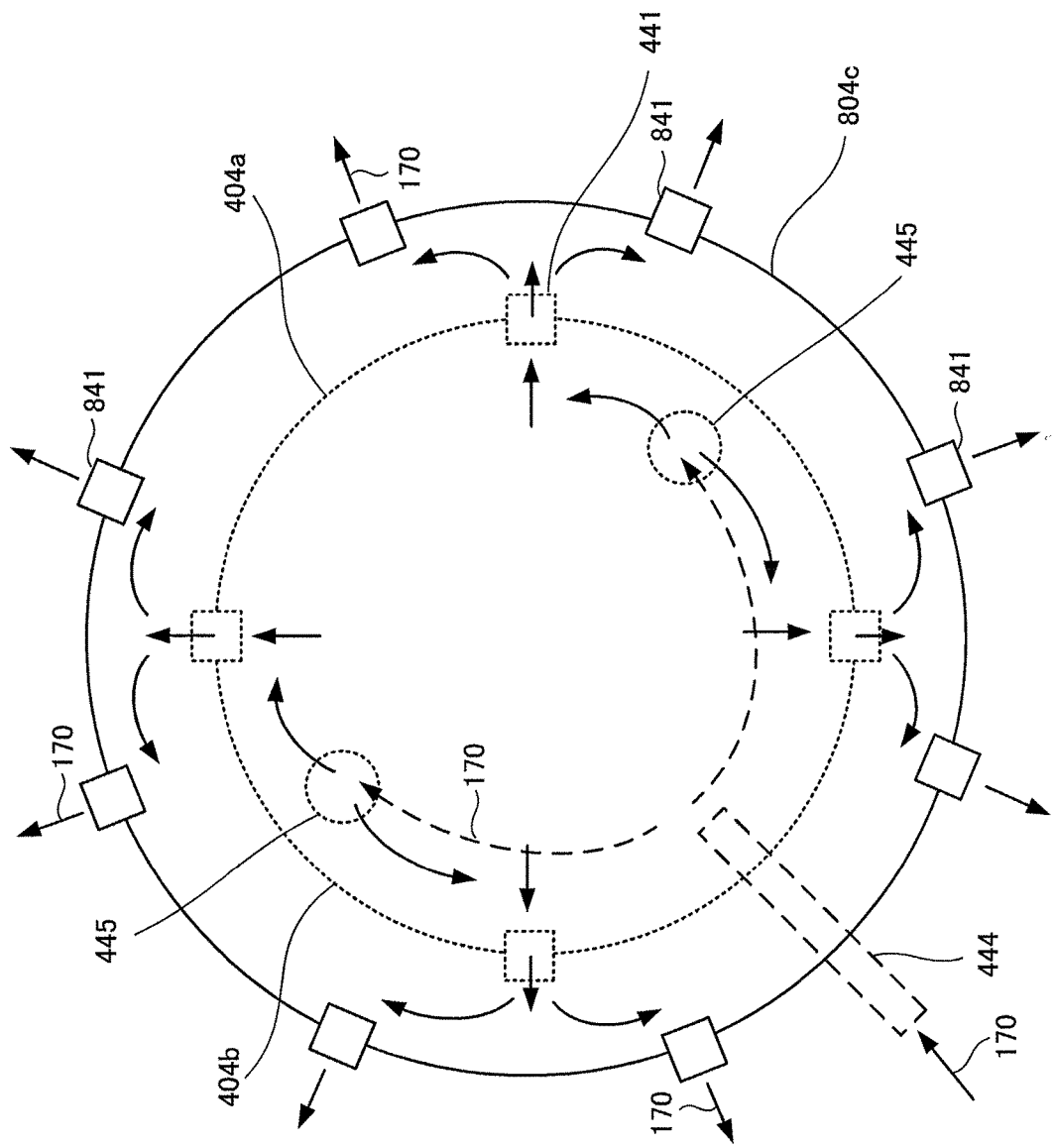
FIG. 9 is a schematic plan view showing the arrangement of the processing nozzle and the flowing of a powder flow according to the third embodiment of the present invention.

FIG. 9 is a schematic plan view schematically showing the arrangement of the processing nozzle 800 and the flowing of the powder flow. Note that in FIG. 9, the thickness and the like of each branching portion are appropriately omitted in order to avoid the drawing from being complicated.

The powder flow 170 having flowed into the branching portion 404a from the introduction pipe 444 is branched into left and right flows, and the two flows flow into the branching portion 404b formed below the branching portion 404a from two branch passage ports 445 formed in the bottom surface of the branching portion 404a. Each of the powder flows 170 having flowed into the branching portion 404b is further branched into two flows, thereby forming a total of four branched powder flows 170. The four branched powder flows 170 flow out into the branching portion 804c from four branch passage ports 441 which communicate from the branching portion 404b to the branching portion 804c.

Each of the four powder flows 170 having flowed out into the branching portion 804c is further branched into two flows, thereby forming a total of eight powder flows 170. The eight branched powder flows 170 flow out into a buffer tank 143 from eight branch passage ports 841 which communicate from the branching portion 804c to the buffer tank 143.

That is, in the processing nozzle 800, the powder flow 170 is branched into two flows in the branching portion 404a, the two branched flows are branched into four flows in the branching portion 404b, the four branched flows are branched into eight flows in the branching portion 804c, and the eight branched flows are introduced to the buffer tank 143.

In this embodiment, no turbulence occurs in the powder flow, so the flow velocity and powder density of the powder flow do not vary, and the powder convergence can be improved. Also, the three stages of branching portions can suppress the powder flow velocity, prolong the powder flow diffusion time, and equalize the powder flows.

Note that the above-described explanation has been made by taking an example in which the branching portions have the three-stage structure, but the branching portion arrangement is not limited to the three-stage structure, and may also be a structure having stages more than three stages, e.g., five or seven stages.

Note also that the above-described explanation has been made by taking an example in which when the number of stages increases from the branching portion 404b (the second stage) to the branching portion 804c (the third stage), the powder flow 170 is guided away from the central axis 180. However, when adopting a structure including, e.g., four or more stages, a branching portion which guides the powder flow 170 closer to the central axis 180 may be formed as a branching portion other than a branching portion in the final stage (a branching portion immediately before the buffer tank 143). This arrangement makes it possible to freely control the flow velocity and powder density of the powder flow 170.

Fourth Embodiment

Figure 10:
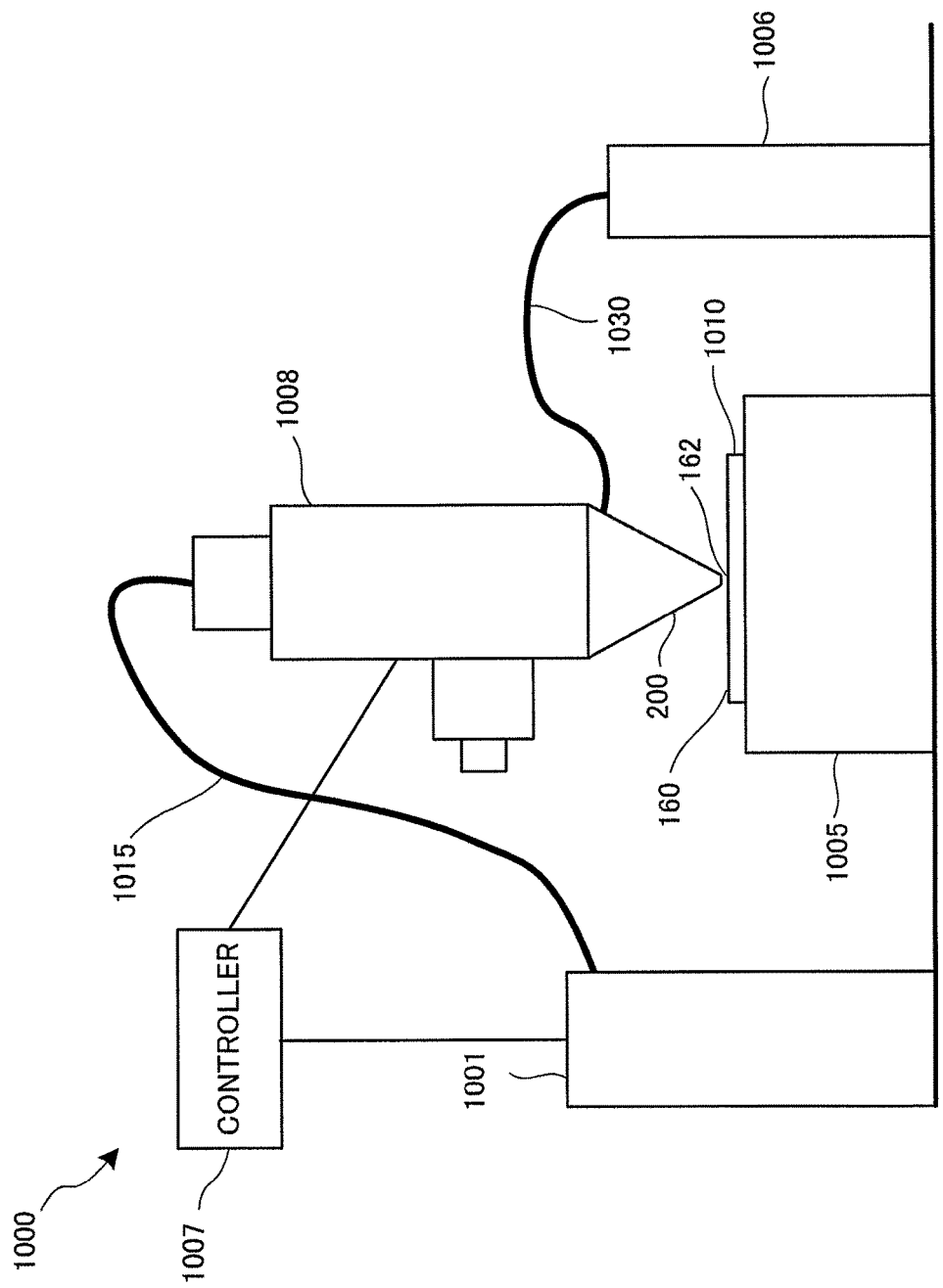
FIG. 10 is a view for explaining the arrangement of an optical machining apparatus according to the fourth embodiment of the present invention.

An optical machining apparatus 1000 according to the fourth embodiment of the present invention will now be explained with reference to FIG. 10. The optical machining apparatus 1000 is an apparatus that includes one of the processing nozzles 100, 400, and 800 explained in the above-described embodiments, and forms a three-dimensional shaped object or performs overlay welding by melting a material contained in a powder flow by heat generated by condensed light. Here, the optical machining apparatus 1000 including a processing nozzle 200 will be explained as an example.

<<Apparatus Arrangement>>

The optical machining apparatus 1000 includes a light source 1001, a light transmitter 1015, a stage 1005, a material storage device 1006, a material supplier 1030, a processing head 1008, and a controller 1007.

The light source 1001 is a laser source here, but can be an LED (Light Emitting Diode), a halogen lamp, xenon lamp, or the like. The light beam to be used to melt a material is not limited to the laser beam, and can be any light beam as long as the light beam can melt a powder material at a processing point. For example, the light beam may be an electron beam, a microwave, or an electromagnetic wave in the ultraviolet range.

The light transmitter 1015 is, for example, an optical fiber having a core diameter of ϕ0.01 to 1 mm, and guides light generated by the light source 1001 to the processing head 1008.

The material storage device 1006 supplies a material-containing carrier gas to the processing head 1008 via the material supplier 1030. The material is, for example, a particle such as a metal particle or a resin particle. The carrier gas is an inert gas and can be, for example, argon gas, nitrogen gas, or helium gas.

The material supplier 1030 is, for example, a resin or metal hose, and guides, to the processing head 1008, a powder flow 170 prepared by mixing a material in a carrier gas.

The processing head 1008 incorporates a condensing device that condenses light serving as the light beam. The processing nozzle 200 is attached downstream of the condensing device. A laser beam supplied to the processing head 1008 is adjusted to be condensed on a process surface 160 through an optical system formed from a lens provided inside and the like. The laser beam irradiates the process surface 160 through the inside of the processing nozzle 200. The optical system is provided to be able to control the condensing position by controlling the lens interval or the like.

The controller 1007 receives a shaping condition such as fine writing or bold writing, changes the output value of a laser beam from the light source 1001 in accordance with the received shaping condition, and slides the outer housing of the processing nozzle 200. By this processing, the controller 1007 controls the powder spot diameter of a powder ejected from the processing nozzle 200 in accordance with the molten pool diameter.

<<Apparatus Operation>>

Next, the operation of the optical machining apparatus 1000 will be explained. A shaped object 1010 is created on the stage 1005. Light emitted by the processing head 1008 is condensed to the process surface 160 on the shaped object 1010. The temperature of the process surface 160 is raised by the condensed light, and the process surface 160 is melted, partially forming a molten pool 162.

The material is ejected from the processing nozzle 200 to the molten pool 162 of the process surface 160. The material is melted into the molten pool 162. After that, the molten pool 162 is cooled and hardened to deposit the material on the process surface 160, implementing three-dimensional shaping.

In this embodiment, highly accurate optical machining can be performed because a processing nozzle having a high powder convergence is used.

Other Embodiments

The present invention has been explained above with reference to the embodiments. However, the present invention is not limited to those embodiments. Various changes understandable by those skilled in the art within the scope of the present invention can be made for the arrangements and details of the present invention. The present invention also incorporates a system or apparatus that somehow combines different features included in the respective embodiments.

In the above-described explanation, the processing nozzle 200, light source 1001, light transmitter 1015, and optical system are explained as discrete members. However, the processing head 1008 may also be obtained by integrally forming these members. Light transmitted from the light source 1001 through the light transmitter reaches the processing nozzle 200 and is emitted from the rear end of the light transmitter 1015. In this case, the light is diverged at a predetermined divergent angle from the rear end of the light transmitter 1015. This divergent light is converted into parallel light once by an internal optical system of the processing nozzle 200, and condensed to the process surface 160. The larger the divergent angle, the larger the beam diameter of the parallel light.

Generally, decreasing the divergent angle is technically more difficult than increasing it. That is, decreasing the beam diameter is technically difficult, and increases the costs and sizes of the light source and light transmitter. Accordingly, an optical processing head which operates even when the beam diameter is large is desirable.

In the optical processing head 1008 using this nozzle, the fluid guide channel can be arranged around the beam path. This effectively makes it possible to design any beam diameter. On the other hand, fluids branched outside the conventional nozzle must flow into the nozzle from the outside, and the branched fluids must join and diffuse as they collide against each other inside the nozzle. Accordingly, it is conventionally difficult to form a large beam path.

In the above-described explanation, the processing nozzle 200, material supplier 1030, and material storage device 1006 are explained as discrete members. However, the optical machining apparatus 1000 may also be obtained by integrally forming these members. The material is guided by the powder flow from the material storage device 1006 to the processing nozzle 200 through the material supplier 1030. In this case, this embodiment requires no branching portion in the supply path. This effectively makes it possible to simplify the arrangement of the whole apparatus and downsize the apparatus. Also, the pressure loss of the powder flow changes in accordance with the position of the branching portion. The pressure loss of the powder flow has influence on the powder convergence. When using this nozzle, the branching portion is always arranged in the same position with respect to the ejection port. This can effectively reduce deterioration of the powder convergence.

The invention claimed is:

1. A processing nozzle comprising:
    an inner cone including a beam path that passes light from a light source;
    an outer cone arranged outside said inner cone;

a fluid ejection channel formed by a gap between said inner cone and said outer cone, and including an ejection port that opens toward a process surface; and a fluid guide channel having at least one introduction port for a fluid, wherein said fluid guide channel guides the fluid toward said fluid ejection channel in a direction away from said beam path.

2. The processing nozzle according to claim 1, wherein said inner cone and said outer cone are coaxially arranged, said fluid guide channel has at least one opening that is opened to guide the fluid to said fluid ejection channel, and a buffer is formed between said opening and said fluid ejection channel.

3. The processing nozzle according to claim 2, wherein the number of said at least one opening is larger than that of said introduction ports.

4. The processing nozzle according to claim 2, wherein said openings are arranged to be rotationally symmetrical with respect to said beam path as an axis.

5. The processing nozzle according to claim 1, wherein said fluid guide channel is formed by a plurality of sequentially arranged branching portions, each branching portion includes a branching portion flow inlet into which a fluid flows, and a branching portion opening from which the fluid flows out, and the branching portion flow inlet of a last branching portion of the plurality of sequentially arranged branching portions is arranged closer to said beam path than the branching portion opening of said last branching portion.

6. The processing nozzle according to claim 5, wherein the branching portion flow inlet of a specific branching portion of the plurality of branching portions is arranged outside the branching portion opening of said branching portion, thereby guiding the fluid flowing through said branching portion in a direction in which the fluid approaches said beam path.

7. An optical machining apparatus a comprising the processing nozzle recited in claim 1.

8. The optical machining apparatus according to claim 7, further comprising:

a material storage portion that stores a material contained in the fluid; and a material supplier that supplies the fluid to said processing nozzle.

9. A processing head comprising:

the processing nozzle recited in claim 1;

said light source;

a light transmitter that transmits light generated from said light source; and an optical system that guides the light transmitted from said light transmitter to said beam path.

10. An optical machining apparatus comprising the processing head recited in claim 9.

* * * * *